Aug. 28, 1951     L. STANTON     2,565,892

ELECTRICAL MEASURING APPARATUS

Filed Feb. 18, 1950

*INVENTOR.*
LEONARD STANTON

BY Arthur H. Swanson

ATTORNEY.

Patented Aug. 28, 1951

2,565,892

UNITED STATES PATENT OFFICE 2,565,892

ELECTRICAL MEASURING APPARATUS

Leonard Stanton, Philadelphia, Pa., assignor to Minneapolis-Honeywell Regulator Company, Minneapolis, Minn., a corporation of Delaware Application February 18, 1950, Serial No. 145,041

3 Claims. (Cl. 171—95)

1

The present inven. on relates to measuring apparatus of the cap  -rebalancing type, adapted for use in measuring thermo-couple and other small unidirectional voltages. In such apparatus, the source of variable unknown voltage to be measured is intermittently connected to and charges a first condenser, which is ordinarily a fixed condenser. A second condenser, which is ordinarily a variable condenser and serves as a comparison or measuring condenser, is intermittently connected to and charged by a source of constant reference voltage. Ordinarily, the latter is a standard cell. Each charge put on the first condenser by the variable voltage source is compared with the charge put on the second condenser by the constant voltage source. When the condenser charges compared are unequal, an out-of-balance signal is produced, and the latter is customarily used to control the operation of a motor which then operates to adjust the variable comparison condenser in the direction and to the extent required to equalize the charges on the two condensers, provided no change in the voltage of the unknown voltage source has occurred in the meantime. The rebalancing motor and its control means which are employed may take various forms, and, in particular, may well be of the widely used form disclosed and claimed in the Wills Patent 2,423,540 of July 8, 1947.

In effecting the charge comparison in capacity-rebalancing apparatus of the type heretofore customary, the source of voltage to be measured and the standard cell or other source of the constant comparison voltage are each connected into, and disconnected from, a measuring circuit in rapid alternation, the frequency of alternation usually being 60 cycles per second. When the apparatus is in its balanced condition, the product of the voltage to be measured and the capacity of the first condenser is equal to the product of the constant or reference voltage and the capacity of the comparison condenser. When the apparatus is unbalanced, said products are unequal, in which case a suitable adjustment of the capacity of the comparison or rebalancing condenser makes the two products equal and thus rebalances the apparatus. In the balanced condition of the apparatus, the corresponding position of the adjustable comparison or rebalancing capacitor provides a measure of the unknown voltage to be measured.

In the practical use of capacity-rebalancing apparatus developed prior to my present invention, it has been found that the standard cell or other source of standard or reference voltage is subject to a small average drain of the order of

2

0.006 microampere, and is also subject to a larger, recurrent, transient drain limited by the internal resistance of the standard cell. The general object of the present invention is to provide measuring apparatus of the character specified comprising a circuit in which the transient current drain amplitudes of the standard voltage source are minimized, whereby a desirable avoidance of shock to which the standard voltage source would otherwise be subjected is realized. I have discovered that the transient current drain amplitudes can be reduced in various ways, and one specific object of the present invention is to provide a simple circuit network in which a resistor is so associated with the standard voltage source that, when the latter is operatively connected to the circuit, it is connected in series with said resistor.

A second specific object of the invention is to reduce the differentiating or triggering action of the circuit portion including the standard voltage source and its associated resistor by connecting a suitably large condenser in shunt with said source and resistor, whereby a reduction in the transient current drain from the standard voltage source is obtained even for practically small resistance values of the last mentioned resistor.

The various features of novelty which characterize my invention are pointed out with particularity in the claims annexed to and forming a part of this specification. For a better understanding of this invention, however, its advantages, and specific objects attained with its use, reference should be had to the accompanying drawings and descriptive matter in which I have illustrated and described preferred embodiments of the invention.

Figure 1:
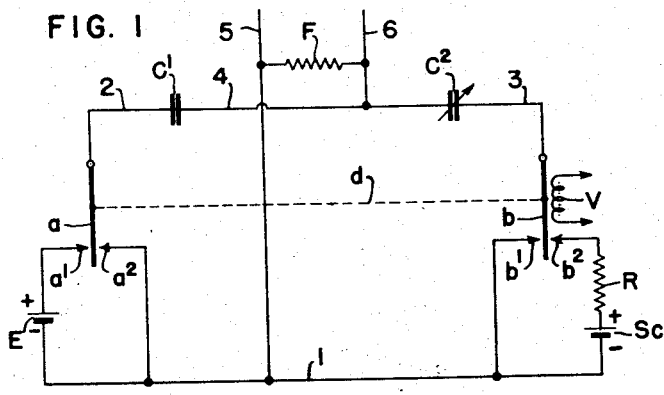
Fig. 1 is a circuit diagram illustrating one embodiment of the invention.

The embodiment of the invention illustrated by way of example in Fig. 1 comprises a circuit network including an unknown source of voltage E to be measured, a standard cell or other standard or reference voltage source Sc, and a conductor I connecting the negative terminals of the voltage sources E and Sc. The network of Fig. 1 also includes a fixed condenser C', having one terminal connected by a conductor 2 to a vibrator reed or movable contact $a$ associated with the voltage source E, a condenser $C^2$, having one terminal connected by a conductor 3 to a vibrator reed or movable contact $b$ associated with the standard cell Sc, and a conductor 4 connecting the second terminal of the condenser C' to the second terminal of the condenser $C^2$. The said network further includes an output conductor 5, connected to the conductor 1, and an output conductor 6, connected to the conductor 4. The output conductors 5 and 6 are provided to connect the network shown in Fig. 1 to electronic detecting and amplifying apparatus of which no portion is shown in Fig. 1 except an impedance F connecting the output conductors or terminals 5 and 6. Said detecting and amplifying apparatus is operative, through a mechanical connection not shown, to vary the capacity of the condenser $C^2$ as necessary to maintain the network in a balanced condition.

The vibrator contact $a$ vibrates back and forth between one position in which it engages a stationary contact $a'$, and a second position in which it engages a stationary contact $a^2$. The contact $a'$ is connected to the positive terminal of the unknown voltage source E, while the contact $a^2$ is connected to the conductor 1. The vibrator contact $b$ similarly vibrates back and forth between one position in which it engages a stationary contact $b'$, and a second position in which it engages a stationary contact $b^2$. The contact $b^2$ is connected through a resistor R to the positive terminal of the standard cell Sc, while the contact $b'$ is connected to the conductor 1. As diagrammatically shown in Fig. 1, the vibrating contact $b$ is operatively associated with a vibrator coil V having terminals for connection to a source of alternating current of low frequency: for example, a source of 60 C. P. S. current. While in practice the vibrating contacts $a$ and $b$ may well form parts of similar separate vibrator units, each including an individual vibrator coil like the coil V, the contacts $a$, $b$, $a'$, $a^2$, $b'$ and $b^2$ may form parts of an automatic switch mechanism which is operative to connect each of condensers C' and $C^2$ alternately to the terminals of the associated voltage source at predetermined intervals. As shown diagrammatically in Fig. 1, the movable vibrator contacts $a$ and $b$ are connected by a link $d$ so that the single coil V may give simultaneous vibratory movements to the contacts $a$ and $b$. The contact arrangement is such that contact $a$ engages the stationary contacts $a'$ and $a^2$, respectively connected to the positive and negative terminals of the variable voltage source E, simultaneously with the respective engagement by the contact $b$ of the stationary contacts $b'$ and $b^2$, respectively connected to the negative and positive terminals of the standard cell Sc.

The inclusion of the resistor R in the standard cell circuit as shown in Fig. 1 limits the peak value of the cell current very nearly to the value $$\frac{e}{r}$$

where $e$ represents the standard cell voltage, and $r$ represents the total resistance in the standard cell circuit: i. e., the resistance of the resistor R plus the internal resistance of the standard cell Sc.

Figure 1A:
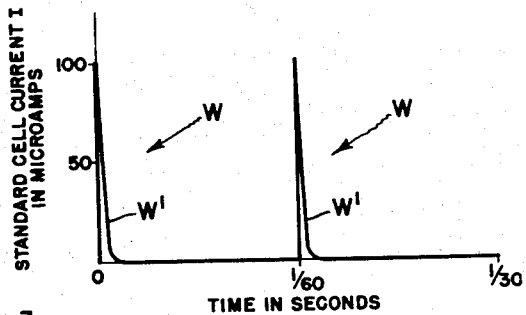
Fig. 1A is a diagram illustrating the wave form of the current flowing through the standard voltage source of Fig. 1.

The wave form W of the current flow I in the standard cell circuit of Fig. 1 is shown diagrammatically in Fig. 1A. The resistance of the resistor R of Fig. 1 cannot be increased indefinitely, since the time constant of the exponential curve portion W' of the wave form W is substantially equal to the product of the resistance $r$ and the capacity of the variable condenser $C^2$, and since this time constant must be negligibly small in comparison with the half cycle period of the alternating current flowing through the vibrator coil V in order to prevent the occurrence of false balance and the transmission of an excessive noise signal to the detector connected across the terminals 5 and 6.

Figure 2:
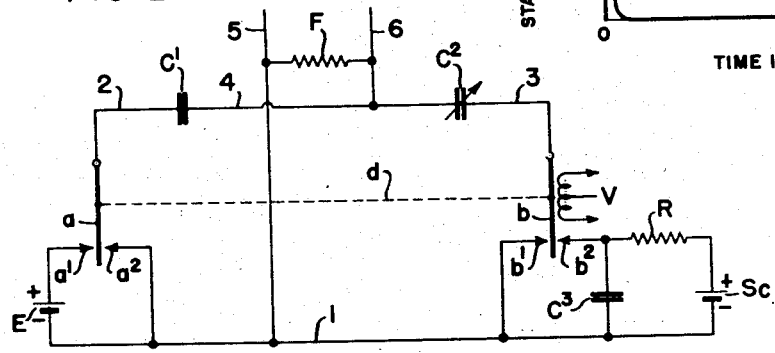
Fig. 2 is a circuit diagram illustrating a second form of the invention.

Fig. 2 illustrates apparatus differing from that shown in Fig. 1 only in that the series connected standard cell and resistor R are shunted by a condenser $C^3$ of considerably greater capacitance than the condenser $C^2$. With the arrangement shown in Fig. 2, it is possible to employ a resistor R having a resistance value suitably small for practical operation and still to keep the peak current flow through the standard cell as low as is practically desirable. With the arrangement shown in Fig. 2, the peak value of the standard cell current is given by the expression $$\left(\frac{e}{r}\right)\left(\frac{c^2}{c^2+c^3}\right)$$

In the foregoing expression, $e$ again represents the voltage of the standard cell Sc, $r$ again represents the resistance of the resistor R plus the internal resistance of the cell Sc, and $c^2$ and $c^3$ respectively represent the capacitances of the condensers $C^2$ and $C^3$. By making the capacitance of the condenser $C^3$ from 250 to 1000 times as great as the capacitance of the condenser $C^2$, which is practically possible, the peak standard cell current obtained with the apparatus of Fig. 2 can be reduced to from four-tenths to one-tenth of one per cent of the peak current obtainable with the arrangement shown in Fig. 1. Since the voltage at the contact point $b^2$ will vary by less than one-quarter of one per cent during the operating cycle, the use of the condenser $C^3$ illustrated in Fig. 2 produces no distortion of the wave form of the unbalance signal applied to the aforementioned detecting and amplifying apparatus by the output conductors 5 and 6.

Figure 2A:
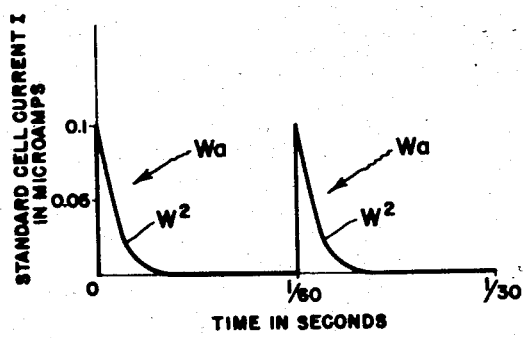
Fig. 2A is a diagram illustrating the wave form of the current flowing through the standard voltage source of Fig. 2.

The wave form of the standard cell circuit current I for the apparatus of Fig. 2 is shown by the curve Wa of Fig. 2A. As Figs. 1A and 2A indicate, the time constant of the exponential portion $W^2$ of the wave form Wa of Fig. 2A is substantially longer than the time constant of the curve portion W' of Fig. 1A, but the value of the current I is materially reduced in Fig. 2A.

By way of illustration, and not by way of limitation, it is noted that when the resistance of the resistor R is 10,000 ohms, the resistance $r$ of the standard cell circuit of Fig. 1 can be considered to be approximately equal to 10,000 ohms, since the internal resistance of the standard cell will be small compared to the resistance of the resistor R. Under this condition, with a typical standard cell voltage $e$ of 1.0190 volts, the peak value of the standard cell circuit current I will be:

$$I_{peak}=\frac{e}{r}$$

$$=\frac{1.0190}{10^4}$$

$$I_{peak}=101.9 \text{ microamperes}$$

It is this peak value which is illustrated by way of example in Fig. 1A.

Similarly, for the arrangement of Fig. 2, the peak value of the standard cell current I for a value of $r$ of 10,000 ohms, a value of $e$ of 1.0190 volts, a value of $c^2$ of 100 micromicrofarads, and a value of $c^3$ of 0.1 microfarad will be:

$$I_{peak} = \frac{e}{r} \times \frac{c^3}{c^2+c^3}$$

$$= \frac{1.0190}{10^4} \times \frac{10^2}{10^2+10^5}$$

$I_{peak} = 0.1$ microampere, approximately

This peak value of I is shown by way of example in Fig. 2A.

While, in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Measuring apparatus comprising a circuit network including a source of substantially constant voltage and first and second measuring terminals adapted for connection to the respective terminals of opposite polarity of a source of variable voltage to be measured, said source of constant voltage having first and second reference terminals of opposite polarity, said first measuring terminal and said first reference terminal being of the same polarity, first and second condensers each having first and second terminals, first conductor means connecting the first terminals of said first and second condensers to one another, a switch mechanism operative to connect the second terminal of said first condenser to said first and second measuring terminals in regular alternation, and to connect the second terminal of said second condenser to said first and second reference terminals during periods in which it respectively connects the second terminal of said first condenser to said second and first measuring terminals, second conductor means connected between said second measuring and reference terminals, a resistor connected by said switch mechanism in series with said source of constant voltage and said second condenser during the periods in which said switch mechanism connects said first reference terminal to the second terminal of said second condenser, whereby the peak current flow through said source of constant voltage is limited, and detecting means connected between said first and second conductor means.

2. Apparatus as specified in claim 1, including a third condenser forming a shunt connection to said series connected resistor and source of constant voltage.

3. Apparatus as specified in claim 2, wherein the capacity of said third condenser is many times the capacity of said second condenser.

LEONARD STANTON.

No references cited.